US012570815B2

(12) United States Patent
Fujiwara et al.

(10) Patent No.: US 12,570,815 B2
(45) Date of Patent: Mar. 10, 2026

(54) POLYPROPYLENE FILM

(71) Applicant: Toray Industries, Inc., Tokyo (JP)

(72) Inventors: Satoshi Fujiwara, Otsu (JP); Kazuma Okada, Otsu (JP); Masatoshi Ohkura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 165 days.

(21) Appl. No.: 18/277,420

(22) PCT Filed: Mar. 29, 2022

(86) PCT No.: PCT/JP2022/015391
§ 371 (c)(1),
(2) Date: Aug. 16, 2023

(87) PCT Pub. No.: WO2022/210693
PCT Pub. Date: Oct. 6, 2022

(65) Prior Publication Data

US 2024/0239973 A1 Jul. 18, 2024

(30) Foreign Application Priority Data

Mar. 31, 2021 (JP) ................................ 2021-059763

(51) Int. Cl.
*C08J 5/18* (2006.01)
*B32B 27/08* (2006.01)
*B32B 27/32* (2006.01)

(52) U.S. Cl.
CPC ................. *C08J 5/18* (2013.01); *B32B 27/08* (2013.01); *B32B 27/32* (2013.01); *B32B 2250/242* (2013.01); *B32B 2270/00* (2013.01); *B32B 2307/518* (2013.01); *B32B 2307/538* (2013.01); *B32B 2307/54* (2013.01); *C08J 2323/12* (2013.01); *C08J 2423/12* (2013.01)

(58) Field of Classification Search
CPC ...... C08J 5/18; C08J 2323/12; C08J 2423/12; B32B 27/08; B32B 27/32; B32B 2250/242; B32B 2270/00; B32B 2307/518; B32B 2307/538; B32B 2307/54; B32B 27/00; B32B 27/36; B32B 2323/10
See application file for complete search history.

(56) References Cited

U.S. PATENT DOCUMENTS

2022/0089822 A1 * 3/2022 Yamada .............. B29C 48/0018

FOREIGN PATENT DOCUMENTS

| | | | | | |
|---|---|---|---|---|---|
| EP | 0172277 | A1 | | 2/1986 | |
| EP | 3124205 | A1 | * | 2/2017 | ........... B29C 55/005 |
| JP | 62233248 | A | | 10/1987 | |
| JP | 0880564 | A | | 3/1996 | |
| JP | 2006130846 | A | | 5/2006 | |
| JP | 2014055276 | A | | 3/2014 | |
| JP | 2014055283 | A | | 3/2014 | |
| JP | 2014205799 | A | | 10/2014 | |
| JP | 2016187959 | A | | 11/2016 | |
| JP | 2020075818 | A | | 5/2020 | |
| JP | 2020132882 | A | | 8/2020 | |
| WO | 2015146894 | A1 | | 10/2015 | |
| WO | 2017159103 | A1 | | 9/2017 | |
| WO | 2018034182 | A1 | | 2/2018 | |
| WO | WO-2020137791 | A1 | * | 7/2020 | ............... B29D 7/01 |
| WO | 2020196602 | A1 | | 10/2020 | |

OTHER PUBLICATIONS

English translation for Imanishi et al (WO 2019/044758 A1) (Year: 2019).*
International Search Report and Written Opinion for International Application No. PCT/JP2022/015391, dated Jun. 21, 2022, 8 pages.

* cited by examiner

*Primary Examiner* — Nathan L Van Sell
(74) *Attorney, Agent, or Firm* — Buchanan Ingersoll & Rooney PC

(57) ABSTRACT

This polypropylene film is characterized in that the tan δ of the main orientation direction at 150° C. is 0.25 or less and the Young's modulus of a direction orthogonal to the main orientation direction is 50 MPa or more at 130° C.
The present invention provides a polypropylene film with excellent heat resistance, mechanical strength, and quality.

13 Claims, 2 Drawing Sheets

POLYPROPYLENE FILM

CROSS REFERENCE TO RELATED APPLICATIONS

This is the U.S. National Phase application of PCT/JP2022/015391, filed Mar. 29, 2022, which claims priority to Japanese Patent Application No. 2021-059763, filed Mar. 31, 2021, the disclosures of each of these applications being incorporated herein by reference in their entireties for all purposes.

FIELD OF THE INVENTION

The present invention relates to a polypropylene film that is excellent in heat resistance, mechanical strength, and quality and can be suitably used as a film for industrial materials.

BACKGROUND OF THE INVENTION

A polypropylene film is excellent in mold-releasing property of the surface and mechanical properties, and thus it is suitably used as a release film or a film for processes for various members such as plastic products, building materials, and optical members. In addition, the polypropylene film is excellent in electrical properties, and thus it is also suitably used for capacitor applications.

One of the required properties of the polypropylene film is heat resistance. For example, when a polypropylene film is used as a cover film for a thermosetting resin or the like, the polypropylene film may be exposed to a high temperature for thermal curing after bonding to the film. In addition, in capacitor applications, the polypropylene film is used in a high-temperature environment in a motor. As described above, the required level of heat resistance for films used for industrial material applications and capacitor applications has been increasing in recent years.

However, a conventional polypropylene film has a lower melting point than a polyethylene terephthalate (PET) film or the like, and has insufficient heat resistance in a process at a high temperature of 100° C. or more, so that its application has been limited. For example, the polypropylene film generally has a melting point of about 160° C., and thus the shrinkage force is large and the mechanical strength is insufficient in a temperature range close to the melting point such as 150° C., and thus the polypropylene film may not be used for a film for processes or the like that is assumed to be used in a high-temperature environment.

One of the indices of heat resistance is thermal shrinkage stress. The thermal shrinkage stress is stress that acts in the shrinkage direction when the film is heated to a predetermined temperature in a state where the film is held at a constant length, and large thermal shrinkage stress may cause defects such as warpage and peeling when the film is used by being bonded to an adherend at a predetermined temperature. Generally, a method of reducing the thermal shrinkage stress includes a method of relaxing the orientation of the amorphous component by performing heat treatment at a high temperature, or a method of reducing the high-molecular-weight component using a low-molecular-weight polypropylene resin. However, the amorphous component is relaxed by heat treatment at a high temperature, which may deteriorate the mechanical strength at a high temperature although the thermal shrinkage stress is suppressed. In addition, a low-molecular-weight polypropylene resin has low melt tension when heated and softened, and using the low-molecular-weight polypropylene resin may deteriorate film formability. As described above, it has been conventionally difficult to achieve both low thermal shrinkage stress and mechanical strength and film formability at a high temperature.

As a polypropylene film having improved heat resistance, for example, Patent Document 1 describes an example in which a highly crystalline polypropylene resin is used to adjust the temperature of a preheating roll during longitudinal stretching to reduce the thermal shrinkage stress. Patent Documents 2 and 3 describe examples in which the thermal shrinkage ratio is reduced by increasing the crystallinity using a polypropylene resin mainly containing a low-molecular-weight component. Further, Patent Document 4 describes an example in which a polypropylene resin having a low polypropylene component dissolved in xylene is used to improve the withstand voltage at a high temperature and reduce the shrinkage stress.

PATENT DOCUMENTS

Patent Document 1: PCT International Publication No. 2020/196602

Patent Document 2: Japanese Patent Laid-open Publication No. 2014-55283

Patent Document 3: PCT International Publication No. 2020/137791

Patent Document 4: Japanese Patent Laid-open Publication No. 2020-132882

SUMMARY OF THE INVENTION

However, in the methods described in Patent Documents 1 and 4, although the heat resistance is improved, there is such a problem in that it is necessary to further improve the heat resistance in the case of assuming use in the above applications. In addition, in the method described in Patent Document 2, the Young's modulus at a high temperature is low, and the flatness of the film may be deteriorated or the film may be broken when the film is conveyed at a high temperature near the film melting point and at a high tension. In addition, the polypropylene film described in Patent Document 3 is problematic in that the thermal shrinkage ratio in the main orientation direction is high, the film shrinks when being conveyed at a high temperature, and wrinkles easily occur. Therefore, an object of the present invention is to solve the above problems. That is, provided is a polypropylene film with excellent heat resistance, mechanical strength, and quality.

In order to solve the above problems, the polypropylene film of the present invention has the following constitution. That is, the polypropylene film according to embodiments of the present invention has a tan $\delta$ of a main orientation direction at 150° C. being 0.25 or less and Young's modulus of a direction orthogonal to the main orientation direction at 130° C. being 50 MPa or more.

The polypropylene film of the present invention is excellent in heat resistance, mechanical strength, and quality, and thus it can be widely and suitably used as a film for industrial materials, a surface protective film, a film for processes, a release film, a film for capacitors, and the like.

DETAILED DESCRIPTION OF EMBODIMENTS OF THE INVENTION

The polypropylene film according to embodiments of the present invention has a tan δ of a main orientation direction at 150° C. being 0.25 or less and Young's modulus of a direction orthogonal to the main orientation direction at 130° C. being 50 MPa or more.

The polypropylene film refers to a film containing a polypropylene resin in an amount of more than 50% by mass and 100% by mass or less relative to 100% by mass of all components constituting the film. The content of the polypropylene resin in the polypropylene film is preferably 70% by mass or more and 100% by mass or less, more preferably 90% by mass or more and 100% by mass or less, still more preferably 95% by mass or more and 100% by mass or less, particularly preferably 96% by mass or more and 100% by mass or less, and most preferably 97% by mass or more and 100% by mass or less, relative to 100% by mass of all components constituting the film. The case where a plurality of components corresponding to the polypropylene resin are contained is regarded as a polypropylene film, as long as the total of the components is more than 50% by mass and 100% by mass or less. In addition, the polypropylene resin refers to a resin in which propylene units account for more than 50 mol % and 100 mol % or less of all the constituent units constituting the resin.

Figure 1:
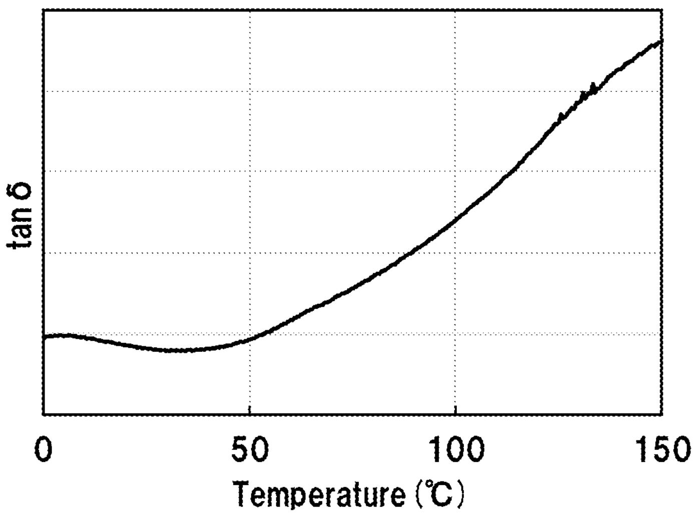
FIG. 1 shows an example of a graph of the temperature dependence of a tan $\delta$ of a polypropylene film.

From the viewpoint of improving heat resistance, it is important that the polypropylene film according to embodiments of the present invention has a tan δ of the main orientation direction at 150° C. being 0.25 or less. From the above viewpoint, the tan δ of the main orientation direction at 150° C. is preferably 0.23 or less, more preferably 0.21 or less, and still more preferably 0.19 or less. The tan δ is also called loss tangent and correlates with the degree of mobility of the molecular chain in the film, and generally increases as the temperature increases in a region of 100° C. or more as shown in FIG. 1. The tan δ of the main orientation direction at 150° C. is an index correlated with the degree of mobility of the molecular chain in the film at around 150° C., and the inventors have found that decreasing this value, in other words, suppressing the movement of the molecular chain at a high temperature suppresses the thermal shrinkage stress of the polypropylene film at a high temperature and enhances the heat resistance. The tan δ of the main orientation direction at 150° C. is preferably as small as possible, and the lower limit is not particularly limited, but is substantially about 0.01.

Herein, the main orientation direction in the present invention refers to a direction showing the highest value when the Young's modulus is measured in each direction forming an angle of 0° to 175° at intervals of 5° with respect to an optional direction when the optional direction is set to 0° in the film plane, and the direction orthogonal to the main orientation direction refers to a direction orthogonal to the main orientation direction in the film plane. The Young's modulus can be measured using a tensile tester, and the details of the measurement method are shown in Examples. When the width of a sample is less than 50 mm and the Young's modulus cannot be obtained by a tensile tester, the crystal orientation of the α crystal (110) plane of the polypropylene film by wide-angle X-ray is measured as follows and taken as the main orientation direction based on the following criteria. That is, an X-ray (CuKα ray) is incident in a direction perpendicular to a film surface, a crystal peak at 2θ=about 14° (α crystal (110) plane) is scanned in a circumferential direction, a direction in which the diffraction intensity of the obtained diffraction intensity distribution is the highest is defined as a main orientation direction, and a direction orthogonal thereto is defined as a direction orthogonal to the main orientation direction. In the present invention, a direction parallel to a direction in which a polypropylene film is formed is referred to as a film formation direction, a longitudinal direction, or an MD direction, and a direction orthogonal to the film formation direction in a film plane is referred to as a width direction or a TD direction.

When the tan δ of the main orientation direction at 150° C. is more than 0.25, the heat resistance of the polypropylene film is insufficient. Therefore, if such a polypropylene film is used as a film for processes or a release film, warpage may occur due to a difference in thermal shrinkage stress between the polypropylene film and an adherend at the timing when the polypropylene film is bonded to the adherend and allowed to pass through a high-temperature process, or the adherend may be partially peeled off, resulting in deterioration of quality. The tan δ of the main orientation direction at 150° C. can be measured using dynamic viscoelasticity, and the details of the measurement method are shown in Examples.

In order to set the tan δ of the main orientation direction at 150° C. to 0.25 or less, for example, there can be used a method of setting the composition of the polypropylene film in the range described later and setting the film formation conditions in the ranges described later. In particular, it is effective to use a highly crystalline resin having a narrow molecular weight distribution Mz/Mw, greatly reduced high-molecular-weight components, and low cold xylene soluble component (CXS), or to shrink the film in the main orientation direction by relaxing the shrinkage in the width direction at a high temperature after lateral stretching (for example, the relaxation rate is 12% or more).

From the viewpoint of enhancing the mechanical strength, the polypropylene film according to embodiments of the present invention has Young's modulus of the direction orthogonal to the main orientation direction at 130° C. being 50 MPa or more, preferably 70 MPa or more, more preferably 90 MPa or more, still more preferably 110 MPa or more. When the Young's modulus of the direction orthogonal to the main orientation direction at 130° C. is less than 50 MPa, the mechanical strength is insufficient. Therefore, when a polypropylene film is used as a film for processes or a release film, high tension is applied in the direction orthogonal to the main orientation direction at the timing when the polypropylene film is bonded to an adherend and allowed to pass through a high-temperature process, which may deform the polypropylene film to cause wrinkles or breakage. The Young's modulus of the direction orthogonal to the main orientation direction at 130° C. is preferably as high as possible, and the upper limit thereof is not particularly limited, but is substantially about 10,000 MPa. In addition, the Young's modulus of the direction orthogonal to the main orientation direction at 130° C. can be measured using a tensile tester equipped with an oven that can be heated at a high temperature, and the details of the measurement method are shown in Examples.

If the amorphous component is shrunk and relaxed by performing a high temperature heat treatment in order to lower the tan δ, the Young's modulus may decrease. In order to increase the Young's modulus, stretching is generally performed at a high stretching ratio, but a resin containing a low amount of the high-molecular-weight component has low melt tension when heated and softened, so that film-forming stability is deteriorated, and therefore stretching may not be performed at a high stretching ratio. Under such circumstances, it has been conventionally difficult to achieve both low tan δ and high Young's modulus particularly at a high temperature with a polypropylene film. However, for example, using a method in which the composition of the polypropylene film is set to the range described later and the film formation conditions are set to the ranges described later can achieve both low tan δ and high Young's modulus. In particular, it is effective that a highly crystalline resin having a low cold xylene soluble component (CXS) is used, or spherulites in an unstretched sheet are homogeneously refined by setting the temperature of the casting drum to a low temperature (10° C. to 40° C.), and then a stretching section during longitudinal stretching is lengthened, and stretching is performed while sufficiently heating both surfaces with a radiation heater in the longitudinal stretching section, thereby longitudinally stretching the film uniformly while reducing stretching stress.

From the viewpoint of quality, the polypropylene film according to embodiments of the present invention preferably has a tan δ of the direction orthogonal to the main orientation direction at 150° C. being 0.25 or less, more preferably 0.23 or less, still more preferably 0.21 or less, and particularly preferably 0.19 or less. The tan δ of the direction orthogonal to the main orientation direction at 150° C. is an index correlated with the degree of mobility of the molecular chain in the film at around 150° C., and decreasing this value enhances the heat resistance of the film. When the tan δ of the direction orthogonal to the main orientation direction at 150° C. is more than 0.25, the polypropylene film is shrunk in the direction orthogonal to the main orientation direction while being wound up as a roll and stored at a high temperature, so that the roll may be wrinkled and the quality may be impaired. The lower limit of the tan δ of the direction orthogonal to the main orientation direction at 150° C. is preferably smaller, and is not particularly limited, but is substantially about 0.01. The tan δ of the direction orthogonal to the main orientation direction at 150° C. can be measured by the same method as the tan δ of the main orientation direction at 150° C.

In order to set the tan δ of the direction orthogonal to the main orientation direction at 150° C. to 0.25 or less or in the above preferable range, a method of setting the composition of the polypropylene film and the film formation conditions to the ranges described later can be used. In particular, it is effective that a highly crystalline resin having a narrow molecular weight distribution Mz/Mw, greatly reduced high-molecular-weight components, and low cold xylene soluble component (CXS) is used, or spherulites in an unstretched sheet are homogeneously refined by setting the temperature of the casting drum to a low temperature (10° C. to 40° C.), and then a stretching section during longitudinal stretching is lengthened, and stretching is performed while sufficiently heating both surfaces with a radiation heater in the longitudinal stretching section, thereby longitudinally stretching the film uniformly while reducing the stretching stress, and the film in the direction orthogonal to the main orientation direction is shrunk by relaxing the conveyance tension in the conveyance flow direction on a high-temperature roll after lateral stretching.

From the viewpoint of quality, the polypropylene film according to embodiments of the present invention preferably has a loss modulus E" of the direction orthogonal to the main orientation direction at 0° C. of $3.5\times10^8$ Pa or less. The loss modulus is more preferably $3.0\times10^8$ Pa or less, still more preferably $2.5\times10^8$ Pa or less, and particularly preferably $2.0\times10^8$ Pa or less. The value of the loss modulus E" of the direction orthogonal to the main orientation direction at 0° C. is preferably as small as possible, and the lower limit thereof is not particularly limited, but is substantially about $0.1\times10^8$ Pa. The loss modulus E" of the direction orthogonal to the main orientation direction at 0° C. can be measured using dynamic viscoelasticity, and the details of the measurement method are shown in Examples.

The loss modulus E" is correlated with the degree of relaxation of the molecular chain in the polypropylene film, and when the loss modulus E" of the direction orthogonal to the main orientation direction at 0° C. is larger than $3.5\times10^8$ Pa, the degree of relaxation of the amorphous component at around 0° C. increases. Therefore, while the polypropylene film is wound up as a roll and stored at room temperature or a temperature in the vicinity thereof, the polypropylene film may shrink in the direction orthogonal to the main orientation direction to wrinkle the roll, and the quality may be impaired.

In order to set the loss modulus E" of the direction orthogonal to the main orientation direction at 0° C. to $3.5\times10^8$ Pa or less, for example, there can be used a method of setting the composition of the polypropylene film in the range described later and setting the film formation conditions in the ranges described later. In particular, it is effective that the spherulites formed during casting are small using a resin having a high crystallization temperature, and the spherulites in the unstretched sheet are homogeneously refined by setting the temperature of the casting drum to a low temperature (10° C. to 40° C.), then a stretching section during longitudinal stretching is lengthened, and the film is longitudinally stretched while sufficiently heating both surfaces with a radiation heater in the stretching section.

In the polypropylene film according to embodiments of the present invention, the product of the Young's modulus of the direction orthogonal to the main orientation direction at 130° C. and the thickness of the film is preferably 500 N/m or more, more preferably 700 N/m or more, still more preferably 900 N/m or more, particularly preferably 1100 N/m or more. The product of the Young's modulus of the direction orthogonal to the main orientation direction at 130° C. and the thickness of the film corresponds to the tension per film width generated when the film is pulled in the direction orthogonal to the main orientation direction at 130° C. When this value is less than 500 N/m, defects may occur when the film is exposed to a high temperature in the processing step. For example, when a polypropylene film is used as a release film, high tension is applied in the direction orthogonal to the main orientation direction when the polypropylene film is bonded to an adherend that is particularly easily deformed and allowed to pass through a high-temperature process, which may cause the flatness of the film to be deteriorated, the adherend to be deformed, and the film to be broken. From the above viewpoint, the upper limit of the product of the Young's modulus of the direction orthogonal to the main orientation direction at 130° C. and the film thickness is not particularly limited, but is substantially about 1000000 N/m. The thickness of the polypropylene film can be measured with a known microthickness meter.

As a method of setting the product of the Young's modulus of the direction orthogonal to the main orientation direction at 130° C. and the thickness of the film to 500 N/m or more or the above preferable range, for example, there can be used a method of setting the composition of the polypropylene film to the range described later and setting the film formation conditions to the ranges described later. In particular, it is effective that a highly crystalline resin having a low cold xylene soluble component (CXS) is used, or spherulites in an unstretched sheet are homogeneously refined by setting the temperature of the casting drum to a low temperature, and then a stretching section during longitudinal stretching is lengthened, and stretching is performed while sufficiently heating both surfaces with a radiation heater in the stretching section, thereby longitudinally stretching the film uniformly while reducing stretching stress. The product of the Young's modulus of the direction orthogonal to the main orientation direction at 130° C. and the thickness of the film can also be adjusted by adjusting the thickness.

The thickness of the polypropylene film according to embodiments of the present invention is appropriately adjusted depending on the application, and is not particularly limited, but is preferably 0.5 μm or more and 100 μm or less from the viewpoint of handleability. The upper limit of the thickness is more preferably 60 μm, still more preferably 30 μm, and particularly preferably 16 μm. The lower limit is more preferably 0.9 μm, still more preferably 4.0 μm. The thickness of the polypropylene film can be adjusted by the screw rotation speed of the extruder, the width of the unstretched sheet, the film formation speed, the stretching ratio, and the like within a range in which other physical properties are not deteriorated.

The polypropylene film according to embodiments of the present invention preferably satisfies $Tc_0+Tm \geq 280$, where $Tc_0$ (° C.) is a crystallization temperature at a cooling rate of 0° C./min determined by an extrapolation point method using a crystallization temperature $Tc_{10}$ (° C.) measured at a cooling rate of 10° C./min and a crystallization temperature $Tc_{40}$ (° C.) measured at a cooling rate of 40° C./min, and Tm (° C.) is a melting point of the film. The value of $Tc_0+Tm$ is more preferably 285 or more, still more preferably 290 or more. $Tc_0$ is an index of ease of crystallization, and the crystallization occurs more easily with increasing $Tc_0$. In addition, Tm is the melting point of the film, and the heat resistance of the film is higher with increasing Tm. The upper limit of the value of $Tc_0+Tm$ is not particularly limited, but is substantially about 350.

Setting the value of $Tc_0+Tm$ to 280 or more provides high heat resistance although the melting point of the film is high, for example, a temperature range close to the melting point such as 150° C. In addition, when such an aspect is adopted, crystallization proceeds quickly, and coarse spherulites are hardly formed during casting. Therefore, the structure of the polypropylene film is made more homogeneous, and breakage during stretching and a decrease in the strength of the film are reduced.

Figure 2:
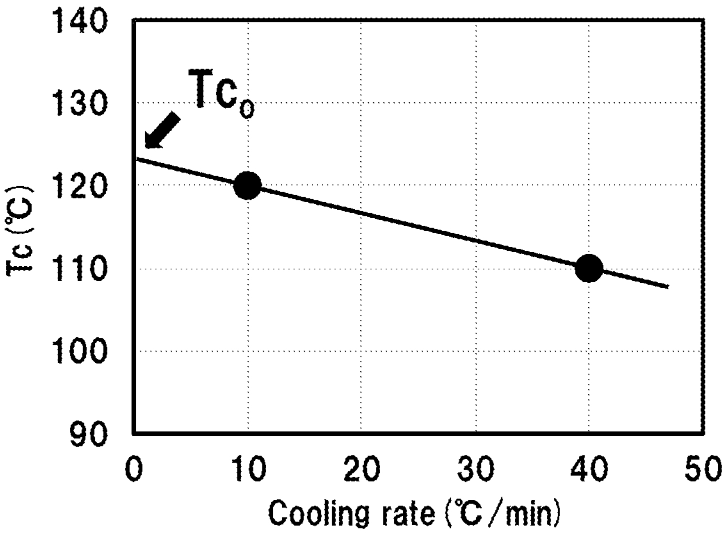
FIG. 2 shows an example of a graph of a crystallization temperature $Tc_0$ of a polypropylene film.

$Tc_{10}$ and $Tc_{40}$ can be measured by the following procedure using a differential scanning calorimeter (DSC). Specifically, 3 mg of a polypropylene film is heated from 25° C. to 250° C. at 20° C./min in a nitrogen atmosphere, and held for 5 minutes. Then, the temperature is lowered from 250° C. to 25° C. at 10° C./min. The peak temperature of the exothermic curve obtained at the time of temperature decrease is defined as $Tc_{10}$, and the polypropylene film is heated from 25° C. to 250° C. at 20° C./min and held for 5 minutes. Then, the temperature is lowered from 250° C. to 25° C. at 40° C./min. The peak temperature of the heat generation curve obtained at the time of temperature decrease is defined as $Tc_{40}$. Then, as shown in FIG. 2, the cooling rate is plotted on the horizontal axis, the crystallization temperature obtained at each cooling rate is plotted on the vertical axis, a straight line is drawn from $Tc_{40}$ toward $Tc_{10}$, and the crystallization temperature when the cooling rate is extrapolated to 0° C./min is defined as $Tc_0$. When a plurality of peak temperatures can be observed, the temperature of the highest peak in the range of 80° C. to 130° C. was used as the crystallization temperature of the polypropylene film. DSC is not particularly limited as long as it can be measured, and a known DSC can be used. As a specific example, EXSTAR DSC6220 manufactured by Seiko Instruments Inc. can be used.

In order to set the value of $Tc_0+Tm$ to 280 or more or the above preferable range, methods for increasing $Tc_0$ and Tm can be used singly or in combination. In order to increase $Tc_0$, a method of setting the composition of the polypropylene film to the range described later can be used. In particular, it is preferable to contain a component having a nucleating agent action, and of these, it is preferable to contain branched polypropylene. In order to increase Tm, for example, there can be used a method of setting the composition of the polypropylene film in the range described later and setting the film formation conditions in the ranges described later. In particular, it is preferable to use a highly crystalline resin having a low cold xylene soluble component (CXS).

The polypropylene film according to embodiments of the present invention preferably has a coefficient of static friction μs of 0.80 or less after being subjected to a heat treatment at 130° C. for 10 minutes from the viewpoint of reducing deterioration in quality after being subjected to a high-temperature environment. The coefficient of static friction μs is more preferably 0.70 or less, still more preferably 0.60 or less, and particularly preferably 0.50 or less. When a polypropylene film is used as a protective film, it may pass through various high-temperature processes. For example, when a polypropylene film is used as a release film of a thermosetting resin, the polypropylene film may be bonded to a thermosetting resin and then thermally cured in a temperature range of 100° C. or more. A polypropylene film generally has low heat resistance as compared with a polyester-based film often used as a film for processes, and the surface is softened or deformed in a scene where heat of 100° C. or more is applied, and the coefficient of static friction is excessively increased. Therefore, lubricity is impaired, and winding deviation may occur when the film is wound after the heating step.

The μs after heating at a higher temperature of 130° C. is 0.80 or less, whereby wrinkles are less likely to be formed on the transport roll at the timing of passing through the process at a high temperature of 100° C. or more, and the winding deviation at the timing of winding together with the adherend is reduced. The lower limit of the coefficient of static friction μs after the heat treatment at 130° C. for 10 minutes is not particularly limited, but is substantially about 0.10.

In order to set the μs after the heat treatment at 130° C. for 10 minutes to 0.80 or less or the above preferable range, for example, there can be used a method of setting the composition of the polypropylene film to the range described later and setting the film formation conditions to the ranges described later. In particular, it is effective to form fine protrusions on the surface by forming a polypropylene film in a laminated configuration and then forming the surface layer in an alloy structure containing an olefin-based resin such as a poly(4-methylpentene)-1-based resin. The μs after heating can be measured in accordance with JIS K 7125 (1999).

The polypropylene film according to embodiments of the present invention preferably has a tensile elongation of 35% or more in the main orientation direction. The tensile elongation is more preferably 40% or more, still more preferably 45% or more, and particularly preferably 50% or more. The tensile elongation in the main orientation direction is 35% or more, whereby breakage of the polypropylene film can be reduced when the polypropylene film is unwound and used from a roll around which the polypropylene film is wound. The tensile elongation may be in a trade-off relationship with the mechanical strength, and from the viewpoint of balance with the mechanical strength, the upper limit of the tensile elongation in the main orientation direction is preferably 300% or less, more preferably 200% or less, still more preferably 80% or less. The tensile elongation in the main orientation direction can be evaluated using a tensile tester, and the details of the measurement method are shown in Examples.

If the stretching ratio is increased in order to increase the mechanical strength or high stress stretching is performed at a low temperature, the tensile elongation is generally likely to decrease. In addition, if the ratio of a highly crystalline polypropylene resin having a low cold xylene soluble component (CXS) is increased, an amorphous component that relaxes stress when tension is applied is insufficient, and the tensile elongation is further decreased. Therefore, it has been conventionally difficult to maintain a high tensile elongation while using a highly crystalline raw material. However, it has been found that the tensile elongation in the main orientation direction can be set to 35% or more, for example, by using a method of setting the raw material composition of the polypropylene film to the range described later and setting the film formation conditions to the ranges described later. In particular, it is effective that the stretching section during longitudinal stretching is lengthened (for example, 200 mm or more), and both surfaces of the film are stretched while being sufficiently heated with a radiation heater or the like in the stretching section, so that longitudinal stretching is uniformly performed while the stretching stress is lowered, or the relaxation rate is increased (for example, 12% or more) in the relaxation treatment after lateral stretching, and heating is performed with a hot roll when passing through the crossing.

In the polypropylene film according to embodiments of the present invention, the maximum height St of both surfaces of the film is preferably less than 2.0 μm. The maximum height St is more preferably less than 1.5 μm, still more preferably less than 1.0 μm, and particularly preferably less than 0.5 μm. If the maximum height St of both surfaces of the film is more than 2.0 μm, in the case where high tension is applied when the polypropylene film is bonded to an adherend and allowed to pass through a high-temperature process, the adherend may be partially peeled off at a portion where St is large, and the quality may be impaired. The lower limit of the maximum height St of both surfaces of the film is not particularly limited, but is substantially about 0.01 μm.

In order to set the maximum height St of both surfaces of the film to less than 2.0 μm or in the above preferable range, for example, there can be used a method of setting the composition of the polypropylene film to the range described later and setting the film formation conditions to the ranges described later. In particular, it is effective that spherulites in an unstretched sheet are homogeneously refined by setting the temperature of the casting drum to a low temperature, and then a stretching section during longitudinal stretching is lengthened, and stretching is performed while sufficiently heating both surfaces with a radiation heater in the longitudinal stretching section, thereby longitudinally stretching the film uniformly while reducing stretching stress.

Hereinafter, a polypropylene resin (may be referred to as a polypropylene resin A) suitable as a component most contained in the polypropylene film of the present invention will be described.

The polypropylene resin A is preferably a linear polypropylene resin from the viewpoint of productivity and film characteristics.

The upper limit of the molecular weight distribution Mz/Mw of the polypropylene resin A is preferably 4.2, more preferably 3.7, and still more preferably 3.2. The lower limit of Mz/Mw is substantially about 1.2. When Mz/Mw is more than 4.2, there are many high-molecular-weight components that are relaxed when the film is heated, and heat resistance may be impaired. In order to set the molecular weight distribution Mz/Mw of the polypropylene resin A to the above value, there are preferably used a method of adjusting the hydrogen gas concentration during polymerization, a method of selecting a catalyst and/or a co-catalyst, a method of appropriately adjusting the composition and polymerization amount of each polymerization tank of continuous polymerization, and the like.

The melt flow rate (MFR) of the polypropylene resin A is preferably in the range of 2.0 g/10 min or more and 20 g/10 min or less (230° C., 21.18 N load) from the viewpoint of increasing film formability and film strength. The lower limit of the MFR is more preferably 2.5 g/10 min, still more preferably 3.0 g/10 min. The upper limit is more preferably 10 g/10 min, still more preferably 8.0 g/10 min, and particularly preferably 6.5 g/10 min. In order to set the MFR of the polypropylene resin A to the above value, a method of controlling the average molecular weight or molecular weight distribution is adopted. More specifically, there are preferably used a method of adjusting the hydrogen gas concentration at the time of polymerization, a method of appropriately selecting a catalyst and/or a co-catalyst and selecting the composition to control the molecular weight and molecular weight distribution of the polypropylene resin, and the like. Reducing the high-molecular-weight component increases the MFR.

The polypropylene resin A preferably has a cold xylene soluble component (CXS) of 3.5% by mass or less. Satisfying these conditions improves dimensional stability and heat resistance of the resulting polypropylene film.

Herein, the "cold xylene soluble component (CXS)" refers to a polypropylene component dissolved in xylene that is obtained by completely dissolving a sample in xylene and then precipitating the resultant at room temperature. This component is thought to correspond to a component that is hardly crystallized because of low stereoregularity or a low molecular weight. Such a component is contained in a large amount in the polypropylene resin A, whereby the thermal dimensional stability of the polypropylene film may be deteriorated. Therefore, from the above viewpoint, the CXS is more preferably 2.0% by mass or less, and still more preferably 1.5% by mass or less. The CXS is preferably as low as possible, but the lower limit is about 0.1% by mass. In order to set the CXS to the above preferable range, there can be used a method of adjusting a polymerization catalyst and process polymerization conditions, a method of enhancing catalytic activity in obtaining a resin, and a method of washing the obtained resin with a solvent or a propylene monomer itself.

In the molecular weight distribution curve measured by gel permeation chromatography, the differential distribution value when the logarithmic molecular weight Log (M) of the polypropylene resin A is 6.5 is preferably 0.2% or more and 9.5% or less. The upper limit is more preferably 8.0% or less, still more preferably 6.5% or less, and most preferably 5.0% or less. The differential distribution value when the logarithmic molecular weight Log (M) is 6.5 is 0.2% or more, whereby a high-molecular-weight component to be a tie molecule during stretching is sufficiently present, and uniformity during stretching is enhanced. In contrast, the differential distribution value when the logarithmic molecular weight Log (M) is 6.5 is 9.5% or less, whereby molecular chains that are relaxed when the polypropylene film is heated are reduced, and the thermal shrinkage stress is reduced. In addition, after the polypropylene film is wound as a roll, normal temperature shrinkage over time is also suppressed, and the flatness of the film roll is maintained.

The polypropylene resin A may contain a copolymerization component with another unsaturated hydrocarbon as long as the object of the present invention is not impaired. Examples of a monomer component constituting such a copolymerizing component include ethylene, 1-butene, 1-pentene, 3-methylpentene-1, 3-methylbutene-1, 1-hexene, 4-methylpentene-1, 5-ethylhexene-1, 1-octene, 1-decene, 1-dodecene, vinylcyclohexene, styrene, allylbenzene, cyclopentene, norbornene, and 5-methyl-2-norbornene. The copolymerization amount is preferably less than 10 mol %, more preferably 5 mol % or less, still more preferably 3 mol % or less, and most preferably 1 mol % or less when the total amount of structural units constituting the polypropylene resin A is 100 mol % from the viewpoint of dimensional stability in the form of a polypropylene film.

The content of the ethylene component as a copolymerization component of the polypropylene resin A is preferably 5 mol % or less when the total amount of structural units constituting the polypropylene resin A is 100 mol %. The content is more preferably 3 mol % or less, still more preferably 1 mol % or less. As the content of the ethylene component is higher, the crystallinity is lower and it is easier to improve the transparency when made into a polypropylene film. However, suppressing the content of the ethylene component to 5 mol % or less reduces deterioration of thermal shrinkage stress due to a decrease in strength and a decrease in heat resistance when forming a polypropylene film. In addition, deterioration of the resin during the extrusion step is also reduced, and the occurrence of fish-eyes in the polypropylene film due to this can also be reduced.

The polypropylene resin A is linear polypropylene, and preferably satisfies the above conditions. Examples of such a polypropylene resin include F-704NP, F-704NT, F-300SP, F113G, E-100GPL, E-105GM, E-200GP, E-203GP, Y-400GP, and E111G, which are polypropylene resins manufactured by Prime Polymer Co., Ltd., and FLX80E4, WF836DG3, FS2011DG3, D101, and W101, which are polypropylene resins manufactured by Sumitomo Chemical Co., Ltd.

The polypropylene film of the present invention may contain a branched polypropylene resin in addition to the linear polypropylene resin A. The branched polypropylene resin has an a-crystal or B-crystal nucleating agent effect. Therefore, containing the branched polypropylene resin suppresses the formation of coarse spherulites during casting by the nucleating agent effect, thereby allowing to improve the heat resistance and mechanical strength of the film.

The MFR of the branched polypropylene resin is preferably 0.5 g/10 min or more and 9 g/10 min or less (230° C., 21.18 N load) from the viewpoint of extrusion stability. The lower limit of the MFR of the branched polypropylene resin is more preferably 2 g/10 min. The upper limit of the MFR of the branched polypropylene resin is more preferably 8 g/10 min. In order to set the MFR of the branched polypropylene resin to the above value, a method for controlling the average molecular weight and the molecular weight distribution or the like is employed. More specifically, there are preferably used a method of adjusting the hydrogen gas concentration at the time of polymerization, a method of appropriately selecting a catalyst and/or a co-catalyst and selecting the composition to control the molecular weight and molecular weight distribution of the polypropylene resin, and the like. The molecular weight is set to be lower, thereby increasing the MFR, and as the amount of low-molecular-weight components in the molecular weight distribution increases, the MFR is higher.

A melt tension of the branched polypropylene resin is preferably 3 gf or more and 40 gf or less from the viewpoint of stretching uniformity. The lower limit of the melt tension is more preferably 4 gf, still more preferably 6 gf. The upper limit is more preferably 30 gf, still more preferably 25 gf. In order to set the melt tension to the above value, a method for controlling the average molecular weight, the molecular weight distribution, the degree of branching in the polypropylene resin, or the like is employed. In particular, in the case of having a long chain branch, the melt tension can be dramatically increased, and its value can be adjusted to a preferable value by adjusting the molecular chain of the long chain branch or the degree of branching.

A plurality of types of branched polypropylene resins such as a Ziegler-Natta catalyst type and a metallocene-based catalyst type are commercially available. From the viewpoint of using the branched polypropylene resin in combination with the polypropylene resin A, it is more preferable to enhance the stretchability by adding a small amount of the Ziegler-Natta catalyst type branched polypropylene resin having a wide molecular weight distribution.

The polypropylene film of the present invention can contain various resins different from polypropylene as long as the object of the present invention is not impaired. Of these, a polyolefin-based resin is preferable because it has high affinity with a polypropylene resin and can improve dispersibility in the polypropylene resin. As the polyolefin-based resin, for example, containing a poly(4-methylpentene)-1-based resin (PMP), a cyclic olefin polymer (COP), a cyclic olefin copolymer (COC), an α-olefin-based elastomer, and the like can form fine projection shapes on the film surface, and can enhance lubricity. Of these, a poly(4-methylpentene)-1-based resin (PMP) is preferably used because it has particularly high affinity with a polypropylene resin.

From the viewpoint of imparting lubricity, the resin different from polypropylene is preferably added to the surface layer in the case of a laminated film, and has preferably 0.1 to 20 parts by mass, more preferably 0.1 to 15 parts by mass, still more preferably 0.1 to 10 parts by mass, and particularly preferably 0.1 to 5.0 parts by mass relative to the total amount of the polypropylene resin in the surface layer. In the case of a single layer film, the resin has preferably 0.1 to 10 parts by mass, more preferably 0.1 to 5.0 parts by mass, still more preferably 0.1 to 3.0 parts by mass, and particularly preferably 0.1 to 1.0 part by mass relative to the total amount of the polypropylene resin. When the amount added of the resin different from polypropylene is too large, the transparency of the film may be deteriorated, or heat resistance and rigidity may be deteriorated. In addition, when the amount added is too small, the effect of imparting lubricity may be poor.

The polypropylene film of the present invention can contain various additives, for example, a crystal nucleating agent, an antioxidant, a heat stabilizer, a sliding agent, an antistatic agent, an antiblocking agent, a filler, a viscosity modifier, a coloring inhibitor, and the like as long as the object of the present invention is not impaired. Of these, selection of the type and amount added of the antioxidant is important from the viewpoint of bleeding out of the antioxidant. That is, the antioxidant is preferably a phenol-based antioxidant having steric hindrance, and at least one of the antioxidants is preferably a high molecular weight type having a molecular weight of 500 or more. Specific examples thereof include various types, and for example, it is preferable to use 2,6-di-t-butyl-p-cresol (BHT: molecular weight 220.4) in combination with 1,3,5-trimethyl-2,4,6-tris (3,5-di-t-butyl-4-hydroxybenzyl)benzene (for example, “Irganox” (registered trademark) 1330: molecular weight 775.2, manufactured by BASF) or tetrakis [methylene-3(3, 5-di-t-butyl-4-hydroxyphenyl) propionate]methane (for example, “Irganox” (registered trademark) 1010: molecular weight 1177.7, manufactured by BASF).

The total content of these antioxidants is preferably in the range of 0.01 to 1.0 part by mass relative to 100 parts by mass of the total amount of the polypropylene resin. If the amount of the antioxidant is too small, the polymer may be deteriorated in the extrusion step and the film may be colored, or the long-term heat resistance may be poor. In contrast, when the amount of the antioxidant is too large, the transparency of the polypropylene film may be deteriorated due to bleeding out of the antioxidant. From the above viewpoints, the content of the antioxidant is more preferably 0.05 to 0.9 parts by mass, and still more preferably 0.1 to 0.8 parts by mass relative to 100 parts by mass of the total amount of the polypropylene resin.

A crystal nucleating agent can be added to the polypropylene film of the present invention within a range not contradictory to an object. Specific examples of the crystal nucleating agent include an α-crystal nucleating agent (dibenzylidene sorbitols, sodium benzoate, phosphoric acid ester-based metal salts, and the like) and a β-crystal nucleating agent (amide-based compounds such as potassium 1,2-hydroxystearate, magnesium benzoate, and N,N'-dicyclohexyl-2,6-naphthalenedicarboxamide, and quinacridone-based compound). However, the excessive addition of the other type of the nucleating agent may cause a decrease in transparency and strength due to a decrease in stretchability, void formation, or the like, and thus the amount added is typically 0.5 parts by mass or less, preferably 0.1 parts by mass or less, and more preferably 0.05 parts by mass or less relative to 100 parts by mass of the total amount of the polypropylene resin, and it is preferable that the nucleating agent is not substantially contained.

The polypropylene film of the present invention preferably does not contain inorganic particles. The polypropylene resin that can be preferably used as a main component of the polypropylene film of the present invention has low affinity with inorganic particles, and thus the inorganic particles may fall off from the film in the production process and contaminate the production line and the product. In addition, coarse protrusions are formed by inorganic particles having high hardness, which may transfer irregularities to the resin layer of the optical member, and this may cause deterioration in quality when used as a protective film or a base film for production of a product requiring high quality such as a display member. From the above viewpoints, the polypropylene film of the present invention preferably does not contain a lubricant such as organic particles.

In the polypropylene film according to embodiments of the present invention, the ratio of the polypropylene resin A and the branched polypropylene resin to the total amount of 100% by mass of the resin components is preferably as follows. The amount of the polypropylene resin A is preferably more than 50% by mass and 99.9% by mass or less from the viewpoint of heat resistance and mechanical strength of the film. The lower limit of the ratio of the polypropylene resin A is more preferably 60% by mass, still more preferably 70% by mass. The upper limit is more preferably 99% by mass, still more preferably 98% by mass. When the film contains two or more components corresponding to the polypropylene resin A, the total of these components is regarded as the content of the polypropylene resin A in the film.

In the polypropylene film according to embodiments of the present invention, the ratio of the branched polypropylene resin is preferably 0.1% by mass or more and 30% by mass or less, and the upper limit thereof is more preferably 10% by mass and still more preferably 5% by mass relative to the entire film. When the film contains two or more components corresponding to the branched polypropylene resin, the total of these components is regarded as the content of the branched polypropylene resin in the film.

The polypropylene film according to embodiments of the present invention preferably has a molecular weight distribution Mz/Mw of less than 4.5, more preferably 4.0 or less, still more preferably 3.5 or less. The lower limit of Mz/Mw of the polypropylene film is substantially about 1.5. When the Mz/Mw of the polypropylene film is less than 4.5, the amount of high-molecular-weight components that are relaxed when heated is small, and the heat resistance and flatness of the polypropylene film are maintained. As a method of setting the molecular weight distribution Mz/Mw of the polypropylene film to the above value, there are preferably used a method of adjusting the hydrogen gas concentration when the polypropylene resin is polymerized, a method of selecting a catalyst and/or a co-catalyst, a method of appropriately adjusting the composition and polymerization amount of each polymerization tank of continuous polymerization, and the like.

The polypropylene film according to embodiments of the present invention preferably has a differential distribution value of 1.0% or more and 10% or less when the logarithmic molecular weight Log (M) is 6.5 in a molecular weight distribution curve measured by gel permeation chromatography. The upper limit is more preferably 8.0% or less, still more preferably 6.0% or less. The differential distribution value when the logarithmic molecular weight Log (M) is 6.5 is 1.0% or more, whereby a high-molecular-weight component to be a tie molecule during stretching is sufficiently present, and uniformity during stretching is enhanced. In contrast, the differential distribution value when the logarithmic molecular weight Log (M) is 6.5 is 10% or less, whereby molecular chains that are relaxed when the polypropylene film is heated are not excessive, and an increase in thermal shrinkage stress is suppressed. In addition, the room-temperature shrinkage over time after the polypropylene film is wound as a roll is also suppressed, and the flatness of the polypropylene film constituting the film roll can also be maintained.

The layer configuration of the polypropylene film of the present invention is not particularly limited, and the polypropylene film can have either a single layer or a laminate, but it preferably has a surface layer (I) and a base layer (II) from the viewpoint of satisfying mutually different characteristics such as heat resistance, rigidity, and lubricity. When the polypropylene film has a single-layer structure, the main component of the polypropylene film itself is preferably a polypropylene resin. When the polypropylene film has a laminated structure, it is more preferable to have at least two layers containing a polypropylene resin as a main component. The "layer containing a polypropylene resin as a main component" refers to a layer containing a polypropylene resin in an amount of more than 50% by mass and 100% by mass or less based on 100% by mass of all components constituting the layer. It is to be noted that the determination as to whether the layer corresponds to the "layer containing a polypropylene resin as a main component" is made not for a plurality of layers collectively but for each layer.

The polypropylene film of the present invention may contain only one type of polypropylene resin, but preferably contains two or more types of polypropylene resin. When two or more components corresponding to a polypropylene resin are contained in the layer, if the total amount of these components is more than 50% by mass and 100% by mass or less, the layer is regarded as a "layer containing a polypropylene resin as a main component".

The content of the polypropylene resin in the "layer containing a polypropylene resin as a main component" is more preferably 90% by mass or more and 100% by mass or less, still more preferably 95% by or more and 100% by mass or less, still more preferably 96% by mass or more and 100% by mass or less, particularly preferably 978 by mass or more and 100% by mass or less, and most preferably 98% by mass or more and 100% by mass or less based on 100% by mass of all components constituting the layer. When the polypropylene film of the present invention has a single-layer structure, the main component of the polypropylene film itself is a polypropylene resin. When the polypropylene film has a laminated structure, the main component of the base layer (II) described later is preferably a polypropylene resin.

The polypropylene film of the present invention is preferably biaxially stretched using the resin described above. The biaxial stretching method may be any of an inflation simultaneous biaxial stretching method, a tenter simultaneous biaxial stretching method, and a sequential biaxial stretching method using a roll stretching machine and a tenter. However, of these, it is preferable to adopt a sequential biaxial stretching method using a roll stretching machine and a tenter from the viewpoint of controlling film-forming stability, thickness uniformity, and high rigidity and dimensional stability of the obtained polypropylene film.

Hereinafter, one aspect of the method for producing a polypropylene film of the present invention will be described by taking a two-type three-layer polypropylene film as an example, but the polypropylene film of the present invention is not necessarily limited thereto.

First, a polypropylene resin A (95 parts by mass) and a branched polypropylene resin (5 parts by mass) are dry-blended and supplied to a single-screw extruder for the base layer (II) (hereinafter, may be referred to as B layer), and the polypropylene resin A (98 parts by mass) and the poly(4-methylpentene)-1-based resin (2 parts by mass) are supplied to a single-screw extruder for the surface layer (I) (hereinafter, may be referred to as layer A). Thereafter, melt extrusion is performed at 200 to 280° C., more preferably 220 to 280° C., and still more preferably 240 to 270° C. Then, foreign matters and a modified polymer are removed by a filter installed in the middle of the polymer tube, and then laminated by a multi-manifold type A layer/B layer/A layer composite T die, and discharged onto a casting drum to be cooled and solidified, thereby obtaining an unstretched sheet having a layer configuration of A layer/B layer/A layer.

In this case, for a lamination thickness ratio, when the lamination thickness ratio of A layer/B layer/A layer is represented as 1/X/1, X is preferably 8 or more and 60 or less, more preferably 15 or more and 55 or less, and still more preferably 20 or more and 50 or less. Within the above range, uniform and fine protrusions made of the poly(4-methylpentene)-1-based resin are formed on the film surface, and lubricity can be imparted. As long as the effect of the present invention is not impaired, the layer configuration may be a two-type two-layer laminated configuration of layer A/layer B. In the case of having a layer configuration of layer A/layer B, when the lamination thickness ratio of layer A/layer B is represented as 1/X, X is preferably 4 or more and 60 or less, more preferably 7 or more and 55 or less, and still more preferably 10 or more and 50 or less.

The surface temperature of the casting drum is 10 to 40° C., preferably 15 to 30° C., more preferably 15 to 25° C., and particularly preferably 20 to 25° C. Setting the temperature of the casting drum within the above preferable range can uniformly refine the spherulites in the unstretched sheet, and can improve the uniformity during stretching. As a method for bringing the film into close contact with the casting drum, any technique such as an electrostatic application method, an adhesion method based on the surface tension of water, an air knife method, a press roll method, and an underwater casting method may be used. It is preferable to use an air knife method, which can impart good flatness and enables control of the surface roughness. From the viewpoint of cooling the non-cooling drum surface side of the sheet on the casting drum, it is preferable to lower the air temperature of the air knife. The air temperature of the air knife is preferably 10 to 40° C., preferably 15 to 30° C., more preferably 15 to 25° C., and particularly preferably 20 to 25° C. The blowing air speed is preferably 130 to 150 m/s. In addition, in order not to cause vibration of the sheet, it is preferable to appropriately adjust the position of the air knife so that the air flows to the downstream side of the film formation. In the case of the two-type two-layer laminated configuration of layer A/layer B, it is preferable to set the layer B side to the casting drum side.

The obtained unstretched sheet is introduced into a longitudinal stretching step. In the longitudinal stretching step, an unstretched sheet is brought into contact with a metal roll maintained at 110° C. or more and 150° C. or less, preferably 120° C. or more and 150° C. or less, and more preferably 130° C. or more and 150° C. or less to be preheated, stretched 4.6 to 7.0 fold, more preferably 5.2 to 6.8 fold, and still more preferably 5.5 to 6.5 fold in the longitudinal direction between rolls having a peripheral speed difference, and cooled to room temperature. In this case, the stretching section during longitudinal stretching is preferably 200 mm or more, more preferably 250 mm or more, and still more preferably 300 mm or more. The upper limit of the stretching section is preferably 1000 mm. The longitudinal stretching is performed by utilizing a peripheral speed difference between the two metal rolls. However, the film during conveyance of the metal rolls before and after stretching is pressed on the metal rolls using nip rolls, whereby the film is less likely to slip on the metal rolls. The stretching section refers to a distance between the nip position of the metal roll before stretching and the nip position of the metal roll after stretching.

The stretching is preferably performed at a temperature (longitudinal stretching temperature) of the roll having a peripheral speed difference of 80° C. or more and 130° C. or less. The longitudinal stretching temperature is more preferably 80° C. or more and 125° C. or less, still more preferably 80° C. or more and 120° C. or less. In addition, it is preferable that radiation heaters are disposed on the upper surface side and the lower surface side of the two rolls having a peripheral speed difference, and the sheet is stretched while being heated from both surfaces. The power of the radiation heater is preferably 1.0 kW or more, more preferably 2.0 kW or more, and still more preferably 2.6 kW or more in both the upper and lower surfaces. The distance between the heat source of the radiation heater and the sheet surface is preferably 10 mm or more and 200 mm or less. The roll in the preheating step of the longitudinal stretching and the roll for providing the peripheral speed difference are set at a low temperature to suppress the relaxation of the molecular chain of the polypropylene resin as much as possible, and heated at once with a radiation heater and simultaneously stretched, whereby it is possible to perform stretching more uniformly even in the present formulation with fewer high-molecular-weight components. In addition, lengthening the stretching section increases neck-down during stretching, and the film is uniformly highly oriented. Therefore, it is effective for improving the Young's modulus of the resulting polypropylene film in the direction orthogonal to the main orientation direction.

Then, the uniaxially stretched film is guided to a tenter with both ends in the width direction held by clips, preheated, and then laterally stretched by 8.5 to 14.0 fold, preferably 9.0 to 13.0 fold, and more preferably 9.5 to 12.0 fold in the width direction. The preheating temperature is 165 to 180° C., preferably 168 to 180° C., more preferably 170 to 180° C. The stretching temperature is 148 to 165° C., preferably 148 to 160° C., and more preferably 148 to 155° C. Setting the preheating temperature to be higher than the stretching temperature by 5° C. or more, preferably 8° C. or more, more preferably 10° C. or more, and still more preferably 16° C. or more can uniformly stretch the film over the entire width of the film, reduce the thickness unevenness, and collect a film roll having good flatness and hardly wrinkled. The uniaxially stretched film has a large neck down, and thus the film width is narrow, and the lateral stretching ratio can be increased even when the film is laterally stretched in a normal tenter rail pattern. Such a method is preferable from the viewpoint of improving the heat resistance of the polypropylene film.

In the subsequent heat treatment and relaxation treatment steps, heat fixation is performed at a temperature of 165° C. or more and less than 180° C., preferably 168° C. or more and less than 180° C., and more preferably 170° C. or more and less than 180° C. while relaxation is applied at a relaxation rate of 12 to 25%, preferably 14 to 20%, and more preferably 16 to 20% in the width direction while both end portions in the width direction are tensely gripped with clips. Thereafter, the film is guided to the outside of the tenter through a cooling step at 80 to 100° C. while both end portions in the width direction are continuously tensely gripped with the clips, and the clips at both end portions in the width direction are released. Then, the film edge portion is slit in a winder step, and the polypropylene film is wound into a roll. Setting the heat treatment temperature to a temperature higher than the lateral stretching temperature by 5° C. or more, preferably 8° C. or more, and more preferably 10° C. or more can relax the residual stress in the film and reduce the thermal shrinkage stress.

In addition, this is preferable from the viewpoint of heat resistance of a polypropylene film that can be obtained by heating with a hot roll when the polypropylene film discharged from the tenter passes through the crossing. The temperature of the hot roll is preferably 80 to 120° C. Setting the temperature of the hot roll to 80° C. or more secures lubricity between the hot roll and the polypropylene film to reduce occurrence of wrinkles and deterioration of flatness in the polypropylene film. The heating time with the hot roll is preferably 0.2 seconds or more, more preferably 0.4 seconds or more, still more preferably 0.5 seconds or more. The upper limit of the heating time is not particularly limited, but is about 2.0 seconds from the viewpoint of productivity.

The polypropylene film of the present invention obtained as described above can be used in various industrial applications such as a packaging film, a surface protective film, a film for processes, a sanitary product, an agricultural product, a building product, a medical product, and a capacitor film, and can be preferably used as a surface protective film, a film for processes, a release film, and a packaging film because it is particularly excellent in heat resistance, mechanical strength, and quality.

Herein, the surface protective film refers to a film that is attached to an object such as a molded body or a film, and has a function of preventing scratches, contamination, and the like generated during processing or transportation. The film for processes refers to a film that is attached to an object such as a molded body or a film to be prevented from scratches, contamination, and the like generated during producing or processing, and discarded when the final product is used. The release film refers to a film having high mold-releasing property, and having a function of preventing scratches, contamination, and the like generated during processing or transportation by being attached to an object such as a molded body or a film, and capable of being easily peeled and discarded when the final product is used. The packaging film refers to a film used for packaging foods and various products.

EXAMPLES

Hereinafter, the present invention will be described in more detail with reference to examples. The characteristics were measured and evaluated by the following methods.

(1) Thickness of Film

The thickness of a film was measured using a micro thickness meter (manufactured by Anritsu Corporation). The film was sampled in a 10-cm square size, and the thickness was measured at 5 randomly selected points, and the average value of the obtained values was taken as the film thickness (μm).

(2) Tan δ (Loss Tangent) and E" (Loss Modulus)

A rectangular test piece (width: 5 mm×length: 20 mm) cut out from a polypropylene film in a measurement direction as a long side was attached to an apparatus chuck portion in an atmosphere at 23° C., cooled to a low temperature of −100° C., and tan δ and E" until the temperature reached 180° C. from −100° C. after the start of temperature rise were measured. A viscoelasticity-temperature curve was drawn by a dynamic viscoelasticity method, and tan δ and E" at each temperature were calculated. The test was performed with n=3, and the average value of the obtained values was taken as tan δ and E" in the measurement direction. The measurement apparatus and conditions are as follows.

Apparatus: Rheogel-E4000 (manufactured by UBM)
Geometry: tensile
Distance between chucks: 10 mm
Frequency: 10 Hz
Strain: 0.1 to 0.2%

Temperature range: −100 to 180° C.

Heating rate: 5° C./min

Measurement atmosphere: nitrogen.

(3) Young's Modulus at 130° C.

A rectangular sample having a length of 150 mm (measurement direction)×a width of 10 mm was cut out from the polypropylene film. The sample was set in a tensile tester ("Tensilon" (registered trademark) UCT-100 manufactured by Orientec Corporation) at an initial distance between chucks of 50 mm, charged into an oven heated to 130° C. together with the chucks, and heated for 1 minute. Thereafter, a tensile test of the film was performed at a tensile speed of 300 mm/min, and the Young's modulus was calculated according to the method specified in JIS K 7161 (2014). The measurement was performed 5 times for each sample, and the average value thereof was taken as the Young's modulus of the sample at 130° C.

(4) Tensile Elongation and Young's Modulus at Room Temperature

A rectangular sample having a length of 150 mm (measurement direction)×a width of 10 mm was cut out from the polypropylene film. The sample was set in a tensile tester ("Tensilon" (registered trademark) UCT-100 manufactured by Orientec Corporation) at an initial distance between chucks of 50 mm, a tensile test of the film was performed at room temperature and a tensile speed of 300 mm/min, and the tensile elongation and the Young's modulus were calculated according to the method defined in JIS K 7161 (2014). The measurement was performed 5 times for each sample, and the average value was taken as the tensile elongation and Young's modulus of the sample. The width direction was set to 0°, the Young's modulus was similarly measured in each direction forming an angle of 0° to 175° at intervals of 5° with respect to the width direction, and a direction showing the highest value was defined as a main orientation direction.

(5) Crystallization Temperature $Tc_0$ Determined by Extrapolation Point Method

Using a differential scanning calorimeter (EXSTAR DSC6220 manufactured by Seiko Instruments Inc.), 3 mg of a polypropylene film was heated from 25° C. to 250° C. at 20° C./min in a nitrogen atmosphere, and held for 5 minutes. Subsequently, the temperature was lowered from 250° C. to 25° C. at 10° C./min, and the peak temperature of the exothermic curve obtained at this temperature lowering was defined as $Tc_{10}$. Thereafter, the polypropylene film was heated from 25° C. to 250° C. at 20° C./min and held for 5 minutes. Subsequently, the temperature was lowered from 250° C. to 25° C. at 40° C./min, and the peak temperature of the exothermic curve obtained at this temperature lowering was defined as $Tc_{40}$. Then, as shown in FIG. 2, the cooling rate was plotted on the horizontal axis, the crystallization temperature obtained at each cooling rate was plotted on the vertical axis, a straight line was drawn from $Tc_{40}$ toward $Tc_{10}$, and the crystallization temperature when the cooling rate was extrapolated to 0° C./min was defined as $Tc_0$. When a plurality of peak temperatures were observed in the measurement of $Tc_{10}$ and $Tc_{40}$, the temperature of the highest peak in the range of 80° C. to 130° C. was used as the crystallization temperature of the polypropylene film. The measurement was performed three times for each sample, and the average value thereof was used for evaluation.

(6) Melting Point Tm

Using a differential scanning calorimeter (EXSTAR DSC6220 manufactured by Seiko Instruments Inc.), 3 mg of a polypropylene film was heated from 25° C. to 250° C. at 20° C./min in a nitrogen atmosphere, and the peak temperature of an endothermic curve obtained during heating was defined as Tm. The measurement was performed three times for each sample, and the average value thereof was used for evaluation.

(7) Coefficient of Static Friction Us in Direction Orthogonal to Main Orientation Direction after Heat Treatment at 130° C. for 10 Minutes Two pieces of polypropylene films were cut out in a width of 6.5 cm (film main orientation direction) and a length of 12 cm (direction orthogonal to the film main orientation direction) to form test pieces, and these test pieces were sandwiched between paper sheets. The test pieces were heated in an oven maintained at 130° C. for 10 minutes under a load of 0, taken out, and then cooled at room temperature. Thereafter, the coefficient of static friction (μs) of the test piece in the direction orthogonal to the main orientation direction was measured at 25° C. and 65% RH according to JIS K 7125 (1999) using a slip tester manufactured by Toyo Seiki Seisaku-sho, Ltd. The measurement was performed in such a manner that the directions orthogonal to the main orientation direction were aligned with each other and the films were stacked so that different surfaces of the films were in contact with each other. The same measurement was performed 5 times per sample, and the average value of the obtained values was calculated and taken as the coefficient of static friction (μs) of the sample.

(8) Maximum Height (St)

The measurement was performed using Ryoka System "VertScan" (registered trademark) 2.0R5300 GL-Lite-AC manufactured by Ryoka System Inc., and the surface shape was obtained by surface correction of the imaging screen with polynomial 4th order approximation using the attached analysis software. The maximum height (St) indicates a difference between the maximum height value (peak) and the minimum height value (valley) in the measurement region. The measurement conditions were as follows. The measurement was performed for each of both surfaces of the film at n=3 (the number of measurements=3), and the average value of each surface was obtained, thereby adopting the St of each surface. In the table, the larger value of the values of St of both surfaces of the film is described.

Apparatus: "VertScan" (registered trademark) 2.0 R5300GL-Lite-AC manufactured by Ryoka Systems Inc.

Measurement conditions: CCD camera SONY HR-57 ½ inch

Objective lens 5×

Intermediate lens: 0.5×

Wavelength filter: 530 nm white

Measurement mode: Wave

Measurement software: VS-Measure Version5.5.1

Analysis software: VS-Viewer Version5.5.1

Measurement region: 1.252 mm×0.939 mm.

(9) Melt Tension

Measurement was performed under the following conditions using an apparatus according to JIS K 7199 (1999).

Apparatus: Capilograph 1BPMD-i with a melt tension tester (manufactured by Toyo Seiki Seisaku-sho, Ltd.)

Temperature: 230° C. (heat retaining chamber used)

Dice: L=8 (mm), D=2.095 (mm)

Extrusion rate: 20 mm/min

Take-up speed: 15.7 m/min

Sample mass: 15 to 20 g.

(10) Evaluation of Flatness During Film Heating

A surface of a polypropylene film having a width of 500 mm and a low value of St was subjected to corona treatment, and an acrylic emulsion adhesive (EX243 manufactured by E-TEC Corporation) was applied to the treated surface. Thereafter, the resulting surface was guided to a drying furnace at 130° C., and conveyed at a conveying tension of 200 N for 60 seconds to remove the solvent in the coating agent, thereby obtaining a film having an adhesive layer having a thickness of 1 μm. Thereafter, this adhesive film was wound into a roll having a winding length of 200 m to form an adhesive film roll. Then, an adhesive film having a width of 500 mm was unwound by 1 m and subjected to a free tension (in a state of being suspended in the vertical direction by the weight of the film), tensions of 1 kg/m and 3 kg/m were uniformly applied to the entire film width without unevenness, and the presence or absence of a poor flatness portion such as wrinkles and dents was visually confirmed. Using the obtained values, flatness evaluation was performed according to the following criteria.

S: There was no portion with poor flatness at the free tension.

A: A portion with poor flatness was observed at the free tension, but the portion with poor flatness disappeared at a tension of 1 kg/m width.

B: A portion with poor flatness was observed at a tension of 1 kg/m, but the portion with poor flatness disappeared at a tension of 3 kg/m.

C: Poor flatness was observed even at a tension of 3 kg/m.

(11) Evaluation of Warpage During Bonding Adherend

The adhesive film obtained in the above (10) and "ZEONOR FILM" (registered trademark) manufactured by Zeon Corporation having a thickness of 40 μm were cut out into a size of 20 cm in the width direction and 30 cm in the longitudinal direction, and the adhesive layer of the adhesive film and "ZEONOR FILM" (registered trademark) were superimposed on each other in such a manner that they were in contact with each other, and bonded together in such a manner that the longitudinal directions were aligned, thereby obtaining a bonded sample. The bonded sample was heated in an oven at 150° C. for 60 seconds and then allowed to cool to room temperature, and warpage of the bonded sample in the width direction was measured. The warpage was measured by placing the bonded sample on a horizontal plane such that "ZEONOR FILM" (registered trademark) was on the lower side, and measuring the height based on the horizontal plane of the long side midpoint. The same measurement was performed on two long sides, and the average value thereof was taken as the warpage of the sample. The evaluation was performed according to the following criteria.

S: Warpage was less than 1 mm.

A: Warpage was 1 mm or more and less than 5 mm.

B: Warpage was 5 mm or more and less than 10 mm.

C: Warpage was 10 mm or more, or the polypropylene film was peeled from "ZEONOR FILM" (registered trademark).

(12) Differential Distribution Value and Molecular Weight Distribution Mz/Mw when Logarithmic Molecular Weight Log (M)=6.5

A polypropylene film was dissolved by stirring at 165° C. for 30 minutes using 1,2,4-trichlorobenzene as a solvent. Thereafter, filtration was performed using a 0.5 μm filter, and the molecular weight distribution of the filtrate was measured by gel permeation chromatography. The molecular weight was corrected using a calibration curve of the molecular weight prepared using the following standard sample to obtain a differential distribution value when the logarithmic molecular weight Log (M) of the sample was 6.5, a weight average molecular weight Mw, and a Z average molecular weight Mz. The measurement apparatus and conditions are as follows.

Apparatus: High-temperature GPC device PL-GPC220 manufactured by Agilent Technologies, Inc.

Detector: Differential refractive index detector (RI detector) manufactured by Agilent Technologies, Inc.

Column: PL1110-6200 (20 μm MIXED-A)×2, manufactured by Agilent Technologies, Inc.

Flow rate: 1.0 mL/min

Column temperature: 145° C.

Injection amount: 0.500 mL

Sample concentration: 0.1 wt %

Standard sample: Monodisperse polystyrene manufactured by Tosoh Corporation, dibenzyl manufactured by Tokyo Chemical Industry Co., Ltd.

(13) Cold Xylene Soluble Component (CXS)

For a polypropylene resin in a case of a raw material, 0.5 g was dissolved in 100 ml of xylene at 135° C. and allowed to cool, and then recrystallized in a thermostatic water bath for 1 hour at 20° C., and then the polypropylene-based component dissolved in a filtrate was quantified by liquid chromatography. Assuming that the amount of the polypropylene-based component dissolved in the filtrate was set as X (g) and the fine amount value of 0.5 g of the sample was set as $X_0$ (g), CXS was calculated by the following formula.

Formula $$CXS\ (\%\ by\ mass) = (X/X_0) \times 100.$$

(Polypropylene Resin and the Like)

Polypropylene resins having molecular weight distributions Mz/Mw, CXS, MFR, and differential distribution values when Log (M)=6.5 shown in Table 1 below were used for production of polypropylene films of Examples and Comparative Examples. These values are values evaluated in the form of resin pellets. Three types of resins were used as polypropylene resin A, and two types of resins were used as other polypropylene resins. In addition, as the branched polypropylene resin and the resin other than polypropylene, the following resins were used, and in some Examples and some Comparative Examples, those prepared previously as follows were used as raw materials for producing a polypropylene film.

<Polypropylene Resin A>

Polypropylene resin 1 (PP1): Manufactured by Prime Polymer Co., Ltd.

Polypropylene resin 2 (PP2): Manufactured by Prime Polymer Co., Ltd.

Polypropylene resin 3 (PP3): Manufactured by Sumitomo Chemical Co., Ltd.

<Other Polypropylene Resins>

Polypropylene resin 4 (PP4): Manufactured by Prime Polymer Co., Ltd.

Polypropylene resin 5 (PP5): Manufactured by Prime Polymer Co., Ltd.

<Branched Polypropylene Resin>

Branched polypropylene resin 1 (branched PP1): Ziegler-Natta catalyst-based branched polypropylene resin (PF-814, manufactured by Basell, melt tension: 15 gf, MFR: 3.0 g/10 min)

Branched polypropylene resin 2 (branched PP2): Metallocene catalyst-based branched polypropylene resin ("WAYMAX" (registered trademark) MFX6, manufactured by Japan Polypropylene Corporation, melt tension: 13 gf, MFR: 3.0 g/10 min).

TABLE 1

| Type | | Mz/Mw | CXS (%) | MFR (g/10 min) | Differential distribution value (%) at Log (M) = 6.5 |
|---|---|---|---|---|---|
| PP raw material A | PP1 | 2.8 | 1.9 | 3.0 | 4.9 |
| | PP2 | 3.3 | 2.7 | 2.0 | 6.3 |
| | PP3 | 4.3 | 1.1 | 7.0 | 8.2 |
| PP4 | | 4.7 | 0.8 | 7.0 | 13.1 |
| PP5 | | 5.8 | 4.5 | 4.0 | 15.0 |

<Resin Other than Polypropylene>

4-Methyl-1-pentene-based polymer 1: MX004 manufactured by Mitsui Chemicals, Inc.

<Polypropylene Raw Material>

Polypropylene raw material 1: Polypropylene resin 2 and 4-methyl-1-pentene-based polymer 1 were supplied from a weighing hopper to a twin-screw extruder so as to be 90:10 (mass ratio), melt-kneaded at 260° C., a molten resin composition was discharged from a die into a strand shape, cooled and solidified in a water bath at 25° C., and cut into a chip shape.

Polypropylene raw material 2: Polypropylene resin 3 and 4-methyl-1-pentene-based polymer 1 were supplied from a weighing hopper to a twin-screw extruder so as to be 90:10 (mass ratio), melt-kneaded at 260° C., a molten resin composition was discharged from a die into a strand shape, cooled and solidified in a water bath at 25° C., and cut into a chip shape.

Example 1

The polypropylene resin 2 and the polypropylene raw material 1 were dry-blended at 80:20 (mass ratio) and supplied to a uniaxial single-screw extruder for the surface layer (I). The polypropylene resin 1 and the branched polypropylene resin 1 were dry-blended at 95:5 (mass ratio) and supplied to a uniaxial single-screw extruder for the base layer (II). Each resin mixture was melt-extruded at 260° C., and foreign matters were removed with a sintered filter of 20 μm cut. Thereafter, the resin mixture was laminated with a feedblock A/B/A composite T die so that the surface layer (I)/base layer (II)/surface layer (I) had a thickness ratio of 1/30/1, discharged to a casting drum with the surface temperature controlled at 25° C., and brought into close contact with the casting drum with an air knife. Thereafter, pressurized air at 20° C. was blown onto the surface of the non-cooling drum of the sheet on the casting drum and injected at an air speed of 140 m/s to cool the sheet, and the sheet was solidified to obtain an unstretched sheet. Subsequently, the unstretched sheet was preheated to 140° C. with a ceramic roll, and the sheet was stretched by 5.7 fold in the longitudinal direction while being heated at 120° C. from both surfaces by a radiation heater between rolls having a peripheral speed difference to obtain a uniaxially stretched film. In this case, the heat source of the radiation heater was fixed at a position of a distance of 90 mm from the sheet surface. The distance (stretching section) between rolls having a peripheral speed difference was 320 mm, and the power of the radiation heater was set to 2.8 kW. Then, the obtained uniaxially stretched film was introduced into a tenter stretching machine with both ends in the width direction held by clips, preheated at 176° C. for 3 seconds, then stretched by 9.8 fold in the width direction at 155° C., and heat-treated at 178° C. while being relaxed by 20% in the width direction. Thereafter, the film was guided to the outside of the tenter through a cooling step at 100° C., the clips at both ends in the film width direction were released, the film was heated with a hot roll at 115° C. for 1.0 second through the crossing, and then wound around the core to obtain a polypropylene film having a thickness of 25 μm. The physical properties and evaluation results of the obtained film are shown in Table 2.

Examples 2 to 5 and Comparative Examples 1 to 5

A polypropylene film was obtained in the same manner as in Example 1 except that the composition and film formation conditions of each layer were as shown in Table 2. In this case, the thickness was adjusted by adjusting the discharge amount in extrusion and adjusting the speed of the casting drum. The physical properties and evaluation results of the obtained film are shown in Table 2. The raw materials were mixed such that the polypropylene resin 2 and the polypropylene raw material 1 were dry-blended at 80:20 (mass ratio) in the same manner as in the surface layer (I) of Example 1 in the surface layers (I) of Comparative Examples 2 and 5, and the polypropylene resin 3 and the polypropylene raw material 2 were dry-blended at 70:30 (mass ratio) in the surface layers (I) of Example 4 and Comparative Example 4. In the surface layer (I) and the base layer (II) of other Examples, each resin component was dry-blended at the ratio in Table 2.

TABLE 2

| Item | | | Example 1 | Example 2 | Example 3 | Example 4 | Example 5 |
|---|---|---|---|---|---|---|---|
| Surface layer (I) | PP resin A | PP1 (parts by mass) | — | — | — | — | — |
| | | PP2 (parts by mass) | 98 | — | — | — | — |
| | | PP3 (parts by mass) | — | — | — | 97 | — |
| | PP resin | PP4 (parts by mass) | — | 95 | — | — | — |
| | | PP5 (parts by mass) | — | — | — | — | 100 |
| | Branched PP resin | Branched PP1 (parts by mass) | — | 5 | — | — | — |
| | | Branched PP2 (parts by mass) | — | — | — | — | — |
| | 4-Methyl-1-pentene-based polymer 1 (parts by mass) | | 2 | — | — | 3 | — |
| Inner layer (II) | PP resin A | PP1 (parts by mass) | 95 | — | 97 | — | — |
| | | PP2 (parts by mass) | — | — | — | 50 | 95 |
| | | PP3 (parts by mass) | — | 100 | — | 50 | — |
| | PP resin | PP4 (parts by mass) | — | — | — | — | — |
| | | PP5 (parts by mass) | — | — | — | — | 5 |

TABLE 2-continued

| | | | | | | | |
|---|---|---|---|---|---|---|---|
| | Branched PP resin | Branched PP1 (parts by mass) | 5 | — | — | — | — |
| | | Branched PP2 (parts by mass) | — | — | 3 | — | — |
| Film formation conditions | Melt extrusion temperature (° C.) | | 260 | 260 | 260 | 260 | 260 |
| | Lamination ratio (surface layer (I)/base layer (II)/surface layer (I))/(surface layer (I)/base layer (II)) | | 1/30/1 | 1/10/1 | Single film | 1/20 | 1/18/1 |
| | Casting drum temperature (° C.) | | 25 | 18 | 38 | 30 | 38 |
| | Air temperature (° C.) | | 20 | 28 | 38 | 30 | 42 |
| | Stretching in longitudinal direction | Preheating temperature (° C.) | 140 | 120 | 118 | 135 | 112 |
| | | Stretching temperature (° C.) | 120 | 120 | 123 | 115 | 125 |
| | | Magnification (times) | 5.7 | 6.2 | 4.8 | 5.2 | 5.7 |
| | | Stretching section (mm) | 320 | 220 | 260 | 320 | 400 |
| | | Radiation heater power (kW) | 2.8 | 1.5 | 2.5 | 3.2 | 0.8 |
| | Stretching in width direction | Preheating temperature (° C.) | 176 | 166 | 178 | 175 | 168 |
| | | Stretching temperature (° C.) | 155 | 160 | 170 | 160 | 160 |
| | | Stretching ratio (fold) | 9.8 | 10 | 8.7 | 9.4 | 11.8 |
| | Heat treatment | Heat treatment temperature (° C.) | 178 | 169 | 166 | 175 | 167 |
| | | Relaxation rate (%) in width direction | 20 | 20 | 13 | 15 | 13 |
| | Cooling temperature (° C.) | | 100 | 90 | 80 | 100 | 100 |
| | Heating through cross | Temperature (° C.) | 115 | 85 | Untreated | 100 | 92 |
| | | Time (s) | 1.0 | 0.4 | Untreated | 0.7 | 0.5 |
| Thickness (μm) | | | 25 | 12 | 20 | 40 | 25 |
| Mz/Mw | | | 3.3 | 4.4 | 2.9 | 3.9 | 3.6 |
| Differential distribution value (%) at Log (M) = 6.5 | | | 5.3 | 8.3 | 2.6 | 7.1 | 6.7 |
| tanδ of main orientation direction at 150° C. | | | 0.19 | 0.18 | 0.24 | 0.22 | 0.23 |
| Young's modulus (MPa) of direction orthogonal to main orientation direction at 130° C. | | | 120 | 70 | 100 | 60 | 60 |
| tanδ of direction orthogonal to main orientation direction at 150° C. | | | 0.15 | 0.14 | 0.28 | 0.24 | 0.20 |
| Loss modulus E'' (Pa) of direction orthogonal to main orientation direction at 0° C. | | | $1.8 \times 10^8$ | $1.8 \times 10^8$ | $3.9 \times 10^8$ | $3.3 \times 10^8$ | $2.9 \times 10^8$ |
| Young's modulus of direction orthogonal to main orientation direction at 130° C. × thickness (N/m) | | | 3000 | 840 | 2000 | 2400 | 1500 |
| $Tc_0 + Tm$ | | | 292 | 288 | 297 | 278 | 275 |
| Coefficient of static friction us after heat treatment at 130° C. for 10 minutes | | | 0.50 | 0.76 | 0.84 | 0.58 | 1.00 |
| Tensile elongation (%) in main orientation direction | | | 52 | 39 | 63 | 48 | 41 |
| Maximum height St (μm) | | | 0.3 | 0.2 | 1.6 | 0.7 | 2.2 |
| Flatness evaluation | | | S | A | S | B | B |
| Warpage evaluation | | | S | S | B | A | B |

| Item | | | Comparative Example 1 | Comparative Example 2 | Comparative Example 3 | Comparative Example 4 | Comparative Example 5 |
|---|---|---|---|---|---|---|---|
| Surface layer (I) | PP resin A | PP1 (parts by mass) | — | — | 95 | — | — |
| | | PP2 (parts by mass) | — | 98 | — | — | 98 |
| | | PP3 (parts by mass) | — | — | — | 97 | — |
| | PP resin | PP4 (parts by mass) | — | — | — | — | — |
| | | PP5 (parts by mass) | — | — | — | — | — |
| | Branched PP resin | Branched PP1 (parts by mass) | — | — | 5 | — | — |
| | | Branched PP2 (parts by mass) | — | — | — | — | — |
| | 4-Methyl-1-pentene-based polymer 1 (parts by mass) | | — | 2 | — | 3 | 2 |
| Inner layer (II) | PP resin A | PP1 (parts by mass) | — | — | — | — | 98 |
| | | PP2 (parts by mass) | — | — | — | — | — |
| | | PP3 (parts by mass) | — | — | 30 | — | — |
| | PP resin | PP4 (parts by mass) | — | 100 | — | — | — |
| | | PP5 (parts by mass) | 100 | — | 70 | 100 | — |
| | Branched PP resin | Branched PP1 (parts by mass) | — | — | — | — | 2 |
| | | Branched PP2 (parts by mass) | — | — | — | — | — |

TABLE 2-continued

| | | | | | | | |
|---|---|---|---|---|---|---|---|
| Film formation conditions | | Melt extrusion temperature (° C.) | 260 | 260 | 250 | 260 | 260 |
| | | Lamination ratio (surface layer (I)/base layer (II)/surface layer (I))/(surface layer (I)/base layer (II)) | Single film | 1/6/1 | 1/80/1 | 1/10/1 | 1/12/1 |
| | | Casting drum temperature (° C.) | 30 | 77 | 95 | 30 | 90 |
| | | Air temperature (° C.) | 45 | 50 | 50 | 50 | 45 |
| | Stretching in longitudinal direction | Preheating temperature (° C.) | 135 | 142 | 100 | 150 | 153 |
| | | Stretching temperature (° C.) | 135 | 142 | 120 | 150 | 128 |
| | | Magnification (times) | 4.5 | 5.1 | 6.3 | 3.8 | 4.9 |
| | | Stretching section (mm) | 220 | 150 | 100 | 220 | 100 |
| | | Radiation heater power (kW) | 2.3 | 1.5 | Unused | Unused | Unused |
| | Stretching in width direction | Preheating temperature (° C.) | 170 | 169 | 160 | 170 | 180 |
| | | Stretching temperature (° C.) | 180 | 161 | 170 | 180 | 173 |
| | | Stretching ratio (fold) | 8.2 | 8.8 | 10.8 | 9.1 | 9.4 |
| | Heat treatment | Heat treatment temperature (° C.) | 168 | 158 | 170 | 170 | 148 |
| | | Relaxation rate (%) in width direction | 6.7 | 11 | 20 | 15 | 11 |
| | | Cooling temperature (° C.) | 50 | 70 | 80 | 80 | 100 |
| | Heating through cross | Temperature (° C.) | Untreated | Untreated | 90 | 115 | Untreated |
| | | Time (s) | Untreated | Untreated | 3.0 | 3.0 | Untreated |
| | | Thickness (μm) | 20 | 2.3 | 25 | 15 | 25 |
| | | Mz/Mw | 5.8 | 4.7 | 5.4 | 5.6 | 3.2 |
| Differential distribution value (%) at Log (M) = 6.5 | | | 15.2 | 12.4 | 13.1 | 14.9 | 5.1 |
| tanδ of main orientation direction at 150° C. | | | 0.31 | 0.28 | 0.26 | 0.20 | 0.26 |
| Young's modulus (MPa) of direction orthogonal to main orientation direction at 130° C. | | | 70 | 150 | 100 | 40 | 160 |
| tanδ of direction orthogonal to main orientation direction at 150° C. | | | 0.24 | 0.21 | 0.28 | 0.18 | 0.27 |
| Loss modulus E" (Pa) of direction orthogonal to main orientation direction at 0° C. | | | $3.8 \times 10^8$ | $3.0 \times 10^8$ | $4.0 \times 10^8$ | $2.4 \times 10^8$ | $2.8 \times 10^8$ |
| Young's modulus of direction orthogonal to main orientation direction at 130° C. × thickness (N/m) | | | 1400 | 345 | 2500 | 600 | 4000 |
| $Tc_0$ + Tm | | | 271 | 275 | 282 | 273 | 281 |
| Coefficient of static friction us after heat treatment at 130° C. for 10 minutes | | | 0.90 | 0.65 | 0.92 | 0.64 | 0.72 |
| Tensile elongation (%) in main orientation direction | | | 51 | 45 | 32 | 58 | 30 |
| Maximum height St (μm) | | | 1.1 | 1.8 | 7.2 | 0.8 | 2.1 |
| Flatness evaluation | | | B | C | A | C | A |
| Warpage evaluation | | | C | C | C | A | C |

In addition, Example 3 and Comparative Example 1 have a single layer configuration, and thus they were regarded as having no surface layer, and the composition was described in the section of the base layer (II).

As described above, the polypropylene film of the present invention can be used in various industrial applications such as a packaging film, a surface protective film, a film for processes, a sanitary product, an agricultural product, a building product, a medical product, and a capacitor film, and can be preferably used as a surface protective film, a film for processes, a release film, and a capacitor film because it is particularly excellent in heat resistance, mechanical strength, and quality.

The invention claimed is:

1. A polypropylene film, wherein a tan δ of a main orientation direction at 150° C. is 0.25 or less and Young's modulus of a direction orthogonal to the main orientation direction at 130° C. is 50 MPa or more, and wherein the polypropylene film satisfies $Tc_0+Tm \geq 280$, where $Tc_0$ (C) is a crystallization temperature at a cooling rate of 0° C./min determined by an extrapolation point method using a crystallization temperature $Tc_{10}$ (° C.) measured at a cooling rate of 10° C./min and a crystallization temperature $Tc_{40}$ (° C.) measured at a cooling rate of 40° C./min, and Tm (° C.) is a melting point of the film.

2. The polypropylene film according to claim 1, wherein tan δ of a direction orthogonal to the main orientation direction at 150° C. is 0.25 or less.

3. The polypropylene film according to claim 1, wherein a loss modulus E" of a direction orthogonal to the main orientation direction at 0° C. is $3.5 \times 10^8$ Pa or less.

4. The polypropylene film according to claim 1, wherein a product of Young's modulus of the direction orthogonal to the main orientation direction at 130° C. and a thickness of the film is 500 N/m or more.

5. The polypropylene film according to claim 1, wherein a coefficient of static friction μs is 0.80 or less after heat treatment at 130° C. for 10 minutes.

6. The polypropylene film according to claim 1, wherein a tensile elongation in the main orientation direction is 35% or more.

7. The polypropylene film according to claim 1, wherein a maximum height St of both surfaces of the film is less than 2.0 μm.

8. The polypropylene film according to claim 1, wherein a differential distribution value is 1.0% or more and 10% or less in a case of a logarithmic molecular weight Log (M)=6.5 in a molecular weight distribution curve measured by gel permeation chromatography.

9. The polypropylene film according to claim 1, wherein a molecular weight distribution Mz/Mw is 1.5 or more and less than 4.5.

10. The polypropylene film according to claim 1, comprising at least two layers containing a polypropylene resin as a main component.

11. A film for processes, comprising the polypropylene film according to claim 1.

12. A release film comprising the polypropylene film according to claim 1.

13. A protective film comprising the polypropylene film according to claim 1.

* * * * *